United States Patent
Punz

(10) Patent No.: US 8,768,287 B2
(45) Date of Patent: Jul. 1, 2014

(54) METHOD FOR TRANSMISSION OF ALARM MESSAGES TO SUBSCRIBER TERMINALS IN A RADIO COMMUNICATIONS SYSTEM

(75) Inventor: Gottfried Punz, Vienna (AT)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 966 days.

(21) Appl. No.: 12/083,918

(22) PCT Filed: Oct. 5, 2006

(86) PCT No.: PCT/EP2006/067100
§ 371 (c)(1),
(2), (4) Date: Aug. 21, 2009

(87) PCT Pub. No.: WO2007/045564
PCT Pub. Date: Apr. 26, 2007

(65) Prior Publication Data
US 2010/0035574 A1    Feb. 11, 2010

(30) Foreign Application Priority Data
Oct. 19, 2005  (DE) .................. 10 2005 050 416

(51) Int. Cl.
*H04M 11/04* (2006.01)

(52) U.S. Cl.
USPC ..................... 455/404.1; 455/456.1

(58) Field of Classification Search
USPC ............... 455/404.1, 456.1, 456, 458
See application file for complete search history.

(56) References Cited

U.S. PATENT DOCUMENTS

| | | | |
|---|---|---|---|
| 5,909,651 A | 6/1999 | Chander et al. | |
| 7,026,926 B1 | 4/2006 | Walker | |
| 2003/0143974 A1* | 7/2003 | Navarro | 455/404 |
| 2003/0157923 A1* | 8/2003 | Tani | 455/404 |
| 2004/0166891 A1* | 8/2004 | Mahkonen et al. | 455/550.1 |
| 2004/0259568 A1* | 12/2004 | Patel | 455/456.1 |
| 2005/0037728 A1* | 2/2005 | Binzel et al. | 455/404.1 |
| 2006/0178128 A1* | 8/2006 | Eaton et al. | 455/404.1 |

FOREIGN PATENT DOCUMENTS

| | | |
|---|---|---|
| EP | 1 719 088 | 10/2007 |
| JP | 10-42365 | 2/1998 |
| JP | 2003-244284 | 8/2003 |
| RU | 2258618 C1 | 8/2005 |
| WO | WO 2007039890 A1 * | 4/2007 |

OTHER PUBLICATIONS

Sasaki et al. JP 10-42365 (Japan patent application submitted in IDS) machine translation in English.*
Japanese Office Action issued Dec. 17, 2010 in corresponding Japanese Patent Application 2008-536011.
International Search Report for Application No. PCT/EP2006/067100; mailed Jan. 29, 2007.

(Continued)

*Primary Examiner* — Jinsong Hu
*Assistant Examiner* — Jean Chang
(74) *Attorney, Agent, or Firm* — Staas & Halsey LLP

(57) ABSTRACT

Alarm messages are transmitted to subscriber terminals of a radio communication system by signalling the alarm presence through a control channel to the subscriber terminals by at least one base station of the radiocommunication system using at least one system information item. Upon reception of the system information item by the subscriber terminals, the subscriber terminals transmit at least one respective recorded alarm signal.

12 Claims, 3 Drawing Sheets

(56) References Cited

OTHER PUBLICATIONS

English Translation of the Russian Office Action issued Oct. 4, 2010 in corresponding Russian Patent Application 2008119485/09(022745).

3GPP TS 25.331, Rel. 6.4.0 (Dec. 2004); Technical Specification Group Radio Access Network, Radio Resources Control (RRC) Protocol Specification; pp. 1-1119.

3GPP TS 44.018, Rel. 7.1.0 (Sep. 2005), Technical Specification Group GSM/EDGE Radio Access Network, Mobile radio inteface layer 3 specification, Radio Resource Control (RRC) protocol; pp. 1-373.

3GPP TS 44.060, Rel. 7.1.0 (Sep. 2005), Technical Specification Group GSM/EDGE, Radio Access Network, General Packet Radio Service (GPRS), Mobile Station (MS)—Base Station System (BSS) Interface, Radio Link Control/Medium Access Control (RLC/MAC) protocol; pp. 1-431.

\* cited by examiner

METHOD FOR TRANSMISSION OF ALARM MESSAGES TO SUBSCRIBER TERMINALS IN A RADIO COMMUNICATIONS SYSTEM

CROSS REFERENCE TO RELATED APPLICATIONS

This application is based on and hereby claims priority to German Application No. 10 2005 050 416.7 filed on Oct. 19, 2005, the contents of which are hereby incorporated by reference.

BACKGROUND

Described below is a method for emission of alarm messages to subscriber terminals in a radio communications system, in particular for emission to mobile subscriber terminals in a mobile radio system. Also described are a subscriber terminal, a radio network controller and a radio communications system for carrying out the method.

The occurrence of catastrophes, caused either naturally or by people, still represents a major requirement for the public authorities in particular with regard to the need to provide a rapid and comprehensive alarm system for the population affected. The traditional use of alarm sirens which are installed covering areas in at least some countries in this case in particular has the disadvantage that no specific information can be transmitted, not least because it cannot be assumed that the population wish to distinguish between different alarms. Further known methods for alarming the population include television and radio broadcast transmissions, although these have the disadvantage that they can be received only by terminals that are being used.

In addition to this use of public facilities, methods have been developed which provide alarms by cable-based or mobile communications systems. In particular, mobile radio systems appear to be suitable for applications such as these in this case, since, in particular in countries with a high penetration rate, a large proportion of the population can be accessed irrespective of their current location. Methods based on communications systems have the disadvantage, however, that the dedicated dialing of a large number of telephones takes a long time. This is particularly true when using the so-called short message service (SMS), as is implemented inter alia in the known GSM mobile radio system. Furthermore, the transmission of short messages has the negative effect that the mobile radio system, which is generally already heavily loaded, is additionally loaded, thus making it possible for further delays to occur in the transmission of short messages.

Methods are therefore being introduced to speed up the transmission of short messages, making use of the so-called "cell broadcasting" functionality of the GSM mobile radio system. In this context, reference is made by way of example to the internet page that was available at www.cell-alert.co.uk/emergency_management.htm, which also supported the above statements. Despite the advantages achieved in this way, it is, however, disadvantageously necessary in terms of the alarm speed and the load on the mobile radio system for each of the subscribers to have enabled the function of reception of cell broadcast messages on their terminals, since the terminal will otherwise not receive such messages, or display them.

SUMMARY

An aspect is therefore to specify a method which ensures certain reception and emission of alarm messages on subscriber terminals.

According to the method described below, the presence of an alarm is signalled to the subscriber terminals by at least one system information item from at least one base station in a radio communications system using a control channel, and at least one respectively stored alarm message is transmitted as a consequence of this by the subscriber terminals.

Inter alia, the features of the method described below advantageously make it possible to inform subscriber terminals of the existence of an alarm by system information, irrespective of their current status, that is to say irrespective of whether they are in a so-called idle mode or in an active speech or payload data transmission mode, thus achieving far greater coverage. In addition, each subscriber terminal can individually control the output of an alarm message. For example, the output may be in the form of speech selected by the subscriber.

Another advantage over the use of the cell broadcast functionality described in the introduction is that there is no relationship between the reception of the system information transmitted using a control channel and the presence of a subscription for a service such as this, or connection of this service. In fact, every subscriber terminal is able to receive and to appropriately evaluate system information. In addition, the method advantageously does not require any interaction whatsoever by the subscriber.

The method advantageously avoids interference with services which are active at the time when the alarm is transmitted. For example, the subscriber terminal can output an alarm message without having to interrupt an active speech or data call, so that the subscriber can then continue the call and end it normally, or else ends the existing call while the alarm is being output.

Subscriber terminals which do not support changes or the addition of system information are not disadvantageously affected by the method since they ignore additional information blocks.

BRIEF DESCRIPTION OF THE DRAWINGS

These and other aspects and advantages will become more apparent and more readily appreciated from the following description of exemplary embodiments, taken in conjunction with the accompanying drawings of which.

DETAILED DESCRIPTION OF THE PREFERRED EMBODIMENT

Figure 1:
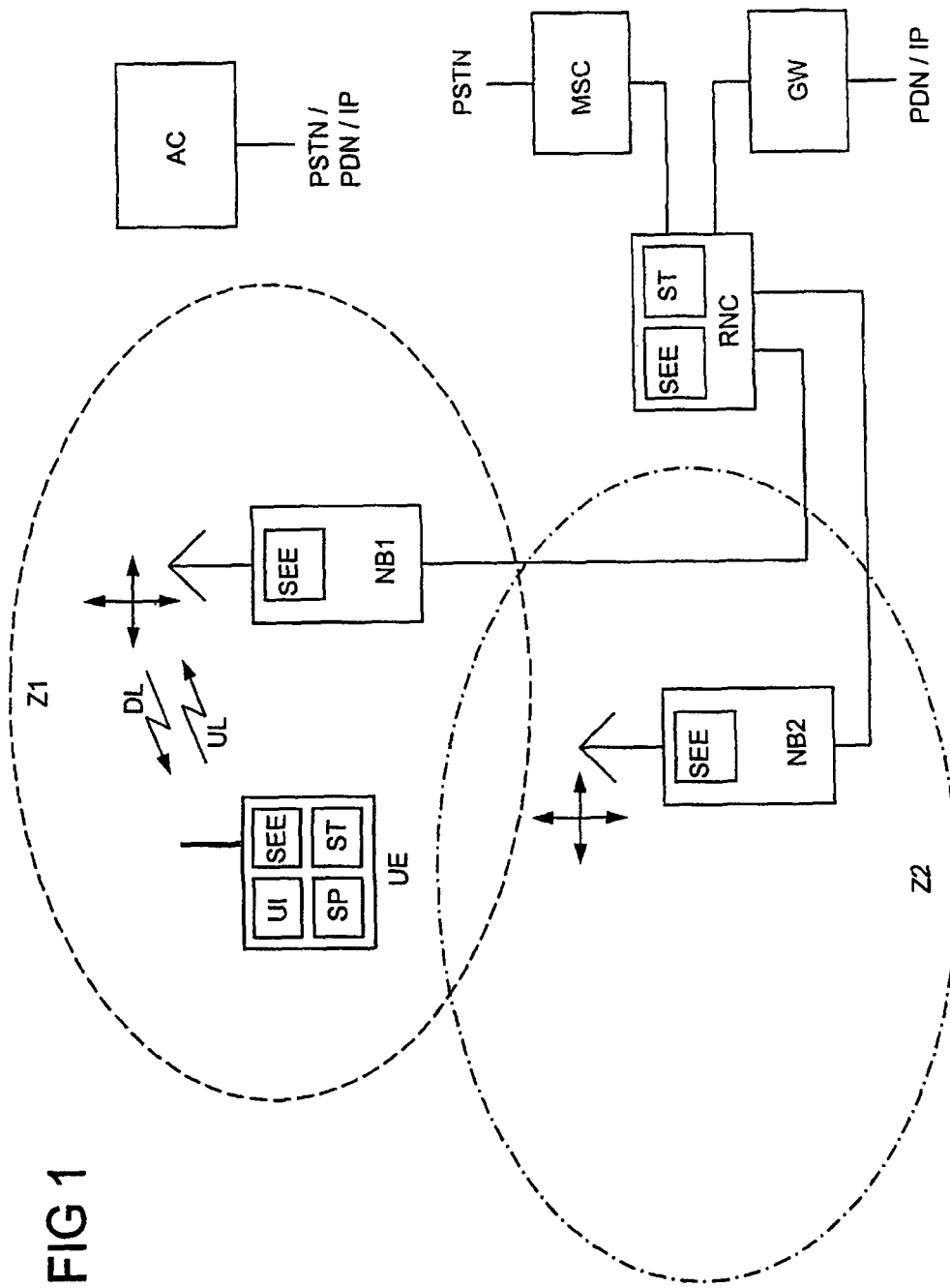
FIG. 1 is a block diagram of a radio communications system based on the UMTS Standard.

Reference will now be made in detail to the preferred embodiments, examples of which are illustrated in the accompanying drawings, wherein like reference numerals refer to like elements throughout.

By way of example, FIG. 1 shows a simplified structure of a radio communications system based on the known UMTS Standard, in which the method can be implemented in the same way in radio communications systems to other Standards, for example, GSM or future generations.

The structure of a radio communications system to the UMTS Standard includes one or more mobile switching centers MSC which are based on so-called circuit-switched connections, as well as management of various functionalities of the system. The mobile switching center MSC furthermore carries out the function of acting as the interface to the public telephone network PSTN (Public Switched Telephone Network). In addition to mobile switching centers MSC, so-called gateways GW also exist, for example SGSN and GGSN, which allow an interface between packet-switched connections in networks with packet-oriented transmission PDN (Packet Data Networks), for example the Internet, with the transmission based on the Internet Protocol IP.

A multiplicity of radio network controllers (RNC are connected to the mobile switching center MSC and/or to the gateway GW, in which, inter alia, physical resources of the radio interface are managed. A radio network control RNC is in turn connected to a multiplicity of base stations NB1, NB2 (Node B) which can set up and initiate connections to terminals UE (User Equivalent) using assigned physical resources of the radio interface. Every base station NB1, NB2 in each case uses the allocated physical resources to supply at least one geographic region, which is also referred to as a radio cell Z1, Z2. The transmission on the radio interface takes place both in the uplink direction UL and in the downlink direction DL. Both the base stations NB1, NB2 and the terminals UE each have transmitting/receiving devices SEE for signal transmission on the radio interface. Furthermore, the radio network controller also has a transmitting/receiving device SEE for interchanging data and signalling messages with the base stations and the mobile switching center and/or the gateway. The terminal UE and the radio network controller RNC furthermore each have a control device ST by which the method can be carried out, as will be described in the following text.

In mobile radio systems based on the GSM and UMTS Standards, system information which is transmitted on so-called broadcast channels, for example the so-called BCCH or BCH (Broadcast Common Control Channel or Broadcast Control Channel, respectively) is transmitted by base stations, is received by subscriber terminals in the so-called idle mode, and is evaluated. In this context, reference should be made to the technical specification in 3GPP TS 25.331, Rel. 6.4.0 (2004-12), Technical Specification Group Radio Access Network, Radio Resource Control (RRC) protocol specification. However, when subscriber terminals are in the so-called connected mode, that is to say they are actively making a call for speech or packet data transmission, system information can also be transmitted via so-called dedicated control channels. In this context, reference should be made to the technical specifications in 3GPP TS 44.018, Rel. 7.1.0 (2005-09), Technical Specification Group GSM/EDGE Radio Access Network, Radio Resource Control (RRC) protocol and 3GPP TS 44.060, Rel. 7.1.0 (2005-09), Technical Specification Group GSM/EDGE Radio Access Network, General Packet Radio Service (GPRS), Mobile Station (MS)—Base Station System (BSS) interface, Radio Link Control/Medium Access Control (RLC/MAC) protocol. This distinction will be taken into account in the following text, in which an implementation of the method using a UMTS-based system will be described first of all, followed by an implementation using the GSM-based system.

As shown in Table 8.1.1 in 3GPP TS 44.018, Rel. 7.1.0, system information in a UMTS-based system may have different geographic transmission ranges, referred to as the "area scope". For example, a distinction is drawn on the basis of transmission in the coverage area of the entire network (PLMN—Public Land Mobile Network) or only in one radio cell (Cell).

The structure of system information is generally highly flexible since it is of modular construction and can therefore be extended in a simple manner. System information can therefore have signalling for an alarm or an alarm message added to it in order to implement the method. An addition such as this is not critical for the so-called RRC (Radio Resource Control) protocol. For example, the system information has already been added in the past, in order to provide location services. In addition, system information which is being changed by additions for example must be read and evaluated by subscriber terminals using the RRC protocol (Paging Type 1, System Information change Indication). System information which supposedly may be transmitted only rarely with an alarm message will therefore be perceived without delay by the receiving subscriber terminals.

By way of example, system information may be added as shown in the illustration in FIG. 2a. By way of example, FIG. 2a shows the structure of a repeatedly transmitted frame FR with a multiplicity of system information blocks SIB as well as a so-called master information block MIB, and two so-called scheduling blocks SCB 1 and SCB 2. The system information blocks SIB 1 to SIB 18 which currently exist as shown in Table 8.1.1 in 3GPP TS 25.331, Rel. 6.4.0 have, for example, had a new system information block SIB 19 added to them. By way of example, "cell" would be assigned to this additional system information block as the "area scope" in the table, in order to allow this to be transmitted on a radio-cell-specific basis. This is particularly worthwhile since, in general, alarm messages affect only a specific locally restricted part of the entire network.

In this case, the added system information block SIB 19 has a specific length. If, for example, one byte (8 bits) is available as net information, then these 8 bits can be used to code N=255 different so-called alarm category indicators which, for example, specify different alarm causes such as fire, earthquake, flooding, etc., and these are finally output as different alarm messages via the user interface UI of the receiving subscriber terminal.

As an alternative to addition of the system information by one or more additional system information blocks, it is likewise feasible to use parts of one or more system information blocks which are normally used for other signalling purposes, for example as illustrated in FIG. 2b. The presence of an alarm can be indicated by, for example, a specific coding of alarm category indicators to those subscriber terminals which note a change in the content of the received system information with an appropriate reaction by them. By way of example, FIG. 2b shows that the system information block SIB 3 has been coded with an alarm category indicator. The system information block SIB 3 which is specified in Section 8.1.1.6.3 of 3GPP TS 25.331, Rel. 6.4.0 is particularly suitable since it is read by subscriber terminals both in the idling mode and in the connected mode. Alternatively suitable system information blocks may be chosen in the same manner for signalling of alarm category indicators.

The system information is added to or modified, for example, by the controlling radio network controller RNC for a number of radio cells, for example all of the radio cells or only a selection of the radio cells of the base stations NB which are linked via the radio network controller. Depending on the alarm which the radio network controller RNC receives, possibly via further devices in the system such as the mobile switching center MSC or a gateway GW, from a central instance, for example a so-called alarm center AC in a public or private facility, the radio network controller RNC configures an appropriate system information item and transmits this in the affected region from the base stations which cover this region. The alarm from the central instance in this case relates, for example, to a specific definition of the alarm type and of the radio cells and/or the geographic region in which the alarm is intended to be transmitted. The alarm signal is added to the system information by the radio network controller for a configurable time interval, for example of several seconds, so that this does not result in any long-term interference with active connections. This can additionally be carried out more than once in order to ensure reliable reception by the receiving subscriber terminals.

According to 3GPP TS 25.331, Rel. 6.4., a subscriber terminal reads system information which is transmitted on a broadcast channel BCH from a base station, both in the idle mode and the connected mode, in the following states; CELL_FACH, CELL_PCH, URA_PCH and CELL_DCH. In addition, subscriber terminals which, in the FDD mode, support simultaneous reception of an SCCPCH (Secondary Common Control Physical Channel) and DPCH (Dedicated Physical Channel) receive, for example, system information on the FACH transport channel when they are in the so-called CELL_DCH state.

In a GSM-based system, the method can be implemented, particularly when the subscriber terminal is in the idle mode, in a largely corresponding manner to the implementation in a UMTS-based system.

If the subscriber terminal is a device which supports only circuit-switched (CS) services, or no PBCCH (Packet Broadcast Control Channel) is available in the radio channel, then the system information on the broadcast channel BCCH is read. If, in contrast, the subscriber terminal supports packet-switched (PS) services and PBCCH is available in the radio cell, then the subscriber terminal reads system information on the PBCCH. In this context, reference should be made to Sections 5.5.1.2 and 5.5.1.3 in 3GPP TS 44.060, Rel. 7.1.0.

For example, one byte of the "SI 4 Rest Octets" in the Type 4 system information message may be used for alarm signaling and alarm category indication on the broadcast transmission channel BCCH. In this context, reference should be made to Section 10.5.2.35 in 3GPP TS 44.018, Rel. 7.1.0. In a corresponding manner, if a PBCCH is available, alarm signalling and alarm category indication can be coded within the packet system information. In this context, reference should be made to Sections 11.2.18 to 11.2.25c in 3GPP TS 44.060, Rel. 7.1.0.

In the connected mode, that is to say during an active circuit-switched connection, or in the packet transfer mode, that is to say during active packet data transmission, a system information message can be transmitted in a comparable manner on a dedicated or associated control channel. This can be done, for example, by transmitting one byte of the "SI 6 Rest Octets" in the Type 6 system information message, which is transmitted on the so-called SACCH (Slow Associated Control Channel). The "SI 6 Rest Octets" information element has a fixed length of 7 bytes, of which only two or 3 are currently used, so that at least four bytes are currently still available for further use. In the packet transfer mode, coding for alarm signaling and alarm category indication should be carried out within a system information message which is transmitted on the PACCH (Packet Associated Control Channel). In this context, reference should once again be made to Sections 11.2.18 to 11.2.25c in 3GPP TS 44.060, Rel. 7.1.0.

Figure 2:
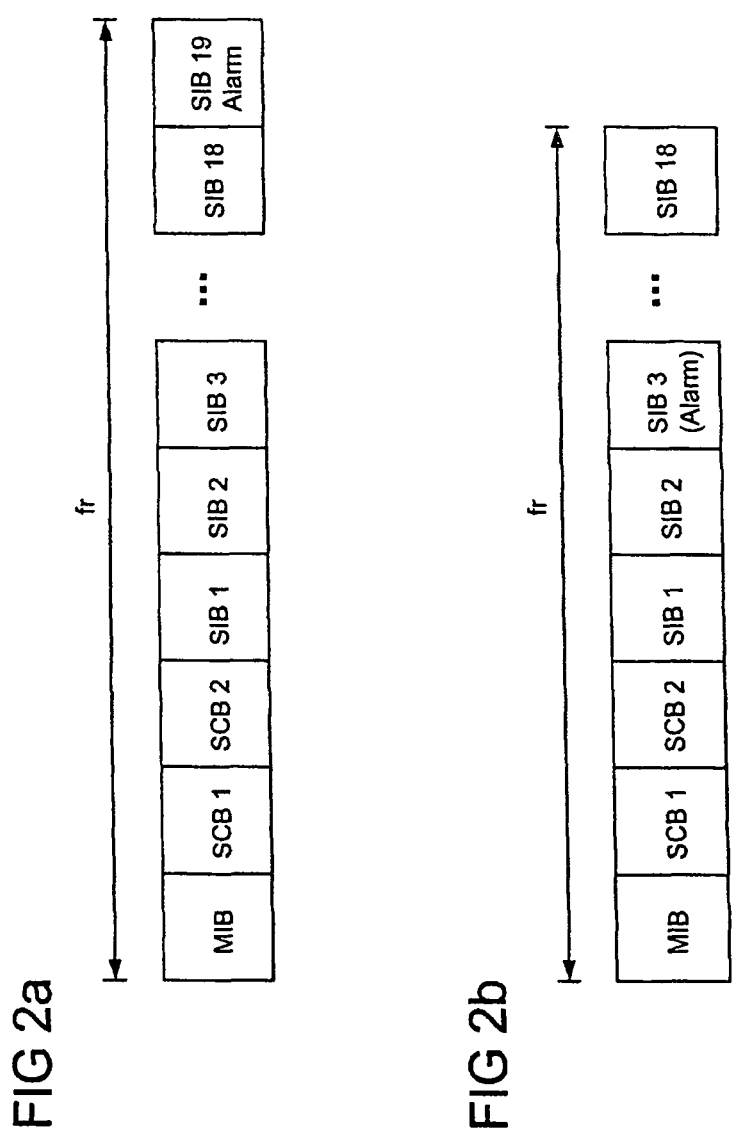
FIGS. 2a and 2b are a frame structure diagrams for two examples of transmission of alarm messages in system information blocks.
Figure 3:
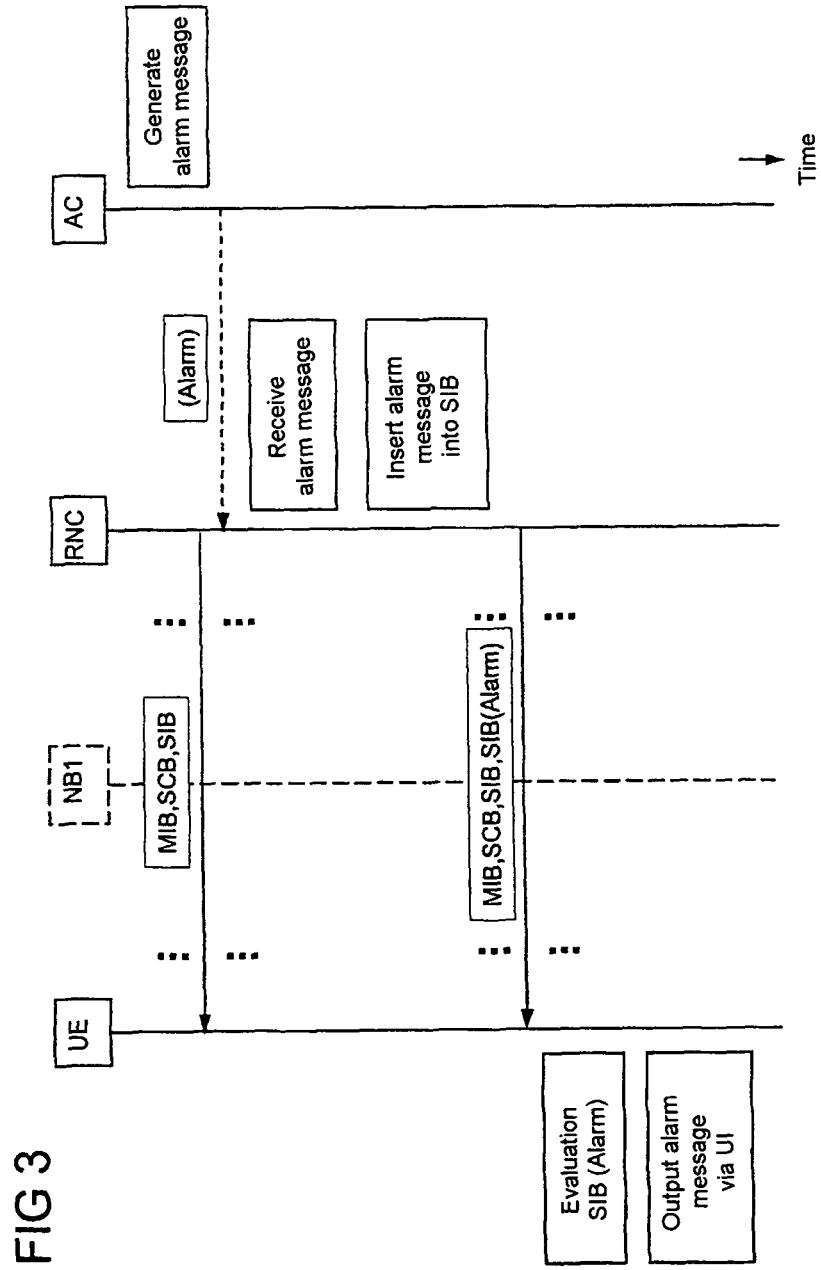
FIG. 3 is a flowchart for the method described below.

The method will be described once again in the following text on the basis of the example of a flowchart as shown in FIG. 3, relating to the system configuration in FIG. 1 and the frame structure in FIG. 2. It is assumed that the base station is NB1 which is affected only indirectly by the method periodically transmits signaling blocks SIB and further information blocks, in particular a master information block MIB using a broadcast channel on the radio interface, such that subscriber terminals UE which are located in the radio cell Z1 of the base station NB1 can receive this.

If an alarm message is now generated by a public or private so-called alarm center AC, for example a fire-service control center, then, after further processing which is not illustrated, implementation and definition of the geographical region within which this alarm message is intended to be transmitted, it is transmitted or signaled to the radio network controller RNC. The radio network controller in turn receives the alarm message Alarm and inserts a corresponding alarm category indicator Alarm into a system information block SIB. In this case, and in a corresponding manner to the description relating to FIGS. 2a and 2b above, the alarm message may be added to, for example, by a supplementary specific system information block or by coding of a system information block which is used for further signaling. If required, the radio network controller RNC uses the previously defined geographic region for evaluation purposes before insertion of the alarm category indicator Alarm into the frame fr, to define which base station or which base stations should transmit the received alarm message, and appropriately adds to the frame fr of the selected base station or base stations.

Finally, the subscriber terminal UE which is located in the radio cell of the base station NB1 receives the alarm category indicator together with further system information blocks, with this information being evaluated by the subscriber terminal UE, and by access to alarm messages which are stored in a memory device SP in the subscriber terminal UE, converts this to an alarm message which can be understood by the user of the subscriber terminal UE, and outputs this, for example as an optical and/or acoustic indication, via a user interface UI.

In addition to the methods described above, appropriate implementations of the method in the relevant components and devices in a radio communications system are also included. For this purpose, these have been appropriately adapted for carrying out the method.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for emission of alarm messages at subscriber terminals in a radio communications system, comprising:
   signaling presence of an alarm to the subscriber terminals by introducing at least one system information item from at least one base station in the radio communications system using a control channel;
   coding a system information block for further signaling responsive to the introducing of the at least one system information item and assigning a selected set of the subscriber terminals to a scope of the system information block; and transmitting at least one respectively stored alarm message in accordance with the coding to the selected set of the subscriber terminals, and wherein a radio network controller determines a corresponding base station of the selected set of the subscriber terminals that should be notified of the alarm based on a previously defined service region and the corresponding base station in the service region transmits the at least one system information item indicating an alarm to the selected set of the subscriber terminals for a configurable time interval.

2. The method as claimed in claim 1, wherein the at least one respectively stored alarm message is emitted at least one of optically and acoustically, by the subscriber terminals.

3. The method as claimed in claim 2, wherein the at least one system information item makes it possible to distinguish between a plurality of alarm categories which are emitted as corresponding alarm messages by the subscriber terminals.

4. The method as claimed in claim 3, wherein the corresponding alarm messages associated with the alarm categories are stored in the subscriber terminals.

5. The method as claimed in claim 4, wherein at least one of the alarm categories is signaled to the subscriber terminals by at least one of an alarm system information item and coding of an informational system information item which contains other information.

6. The method as claimed in claim 1, wherein the at least one system information item is newly added.

7. The method as claimed in claim 1, wherein said introducing includes one of adding at least one system information item as new and using parts of an existing system information item for the at least one system information item.

8. A subscriber terminal of a radio communications system having a base station, comprising:
   at least one receiving device receiving at least one system information item introduced to the radio communications system, transmitted by the base station using a control channel, by which presence of an alarm is signaled, and coding a system information block which is used for further signaling responsive to the introducing of the at least one system information item and assigning a selected set of the subscriber terminals to a scope of the system information block;
   a memory device storing at least one alarm message;
   a control device controlling output of the at least one alarm message stored in said memory device in accordance with the coding to the selected set of the subscriber terminals; and
   wherein upon reception of the at least one system information item, an alarm is indicated at the at least one receiving device, a radio network controller of the radio communications system determines a corresponding base station of the selected set of the subscriber terminals that should be notified of the alarm based on a previously defined service region and a respective alarm message corresponding to the indicated alarm is emitted to the selected set of the subscriber terminals.

9. A radio network controller of a radio communications system, comprising:
   at least one transmitting/receiving device receiving at least one alarm message and emitting the at least one alarm message on a radio interface to at least one receiving subscriber terminal; and a control device controlling addition of at least one system information item about the at least one alarm message prior to transmission on the radio interface, coding of a system information block which is used for further signaling responsive to the addition of the at least one system information item and assigning a selected set of subscriber terminals to a scope of the system information block, determining a corresponding base station of the selected set of the subscriber terminals that should be notified of the alarm based on a previously defined service region and having the corresponding base station in the service region transmit the at least one system information item indicating an alarm to the selected set of the subscriber terminals, and
   signalling the alarm for a configurable time interval.

10. A radio communications system, comprising:
    at least one subscriber terminal;
    at least one radio network controller; and
    a base station signaling presence of an alarm to said at least one subscriber terminal by introducing at least one system information item using a control channel and by coding of a system information block which is used for further signaling responsive to the introducing of the at least one system information item and assigning said at least one subscriber terminal to a scope of the system information block, and
    where said at least one subscriber terminal emits at least one respectively stored alarm message as a consequence of receiving the at least one system information item in accordance with the coding.

11. A base station of a radio communications system having at least one subscriber terminal, comprising:
    a transmitting/receiving device receiving alarm information indicating an alarm; and
    wherein at least one radio network controller of the radio communications system determining a corresponding base station for the alarm based on a previously defined service region, and
    wherein the corresponding base station signals presence of the alarm to said at least one subscriber terminal by introducing at least one system information item using a control channel and by coding of a system information block which is used for further signaling responsive to the introducing of the at least one system information item and assigning said at least one subscriber terminal to a scope of the system information block.

12. A radio network controller of a radio communications system having at least one base station, comprising:
    a transmitting/receiving device receiving alarm information indicating an alarm, the alarm resulting from introduction of at least one system information item having a scope indicating said at least one subscriber terminal; and
    at least one subscriber terminal determined to be notified of the alarm based on a previously defined service region, and
    wherein said at least one base station signals presence of the alarm to said at least one subscriber terminal using a control channel and by coding of the system information block for further signaling responsive to the introduction of the at least one system information item.

* * * * *